(12) United States Patent
Szymaski et al.

(10) Patent No.: US 7,670,423 B2
(45) Date of Patent: Mar. 2, 2010

(54) CEMENT COMPOSITION COMPRISING ENVIRONMENTALLY COMPATIBLE DEFOAMING AGENTS AND METHODS OF USE

(75) Inventors: Michael J. Szymaski, Duncan, OK (US); J. Michael Wilson, Duncan, OK (US); Samuel J. Lewis, Duncan, OK (US); Bryan K. Waugh, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1034 days.

(21) Appl. No.: 11/147,721

(22) Filed: Jun. 3, 2005

(65) Prior Publication Data

US 2006/0272550 A1 Dec. 7, 2006

(51) Int. Cl.
*C04B 24/00* (2006.01)
*C04B 24/02* (2006.01)
(52) U.S. Cl. ............... 106/696; 106/724; 106/737; 106/823
(58) Field of Classification Search ............ 106/724, 106/823, 737, 696
See application file for complete search history.

(56) References Cited

U.S. PATENT DOCUMENTS

| | | | |
|---|---|---|---|
| 2,271,696 A | 2/1942 | Jones | |
| 2,661,334 A | 12/1953 | Lummus | |
| 2,805,719 A | 9/1957 | Anderson | |
| 2,878,875 A * | 3/1959 | Dunlap et al. ............... | 166/293 |
| 2,943,051 A | 6/1960 | Lummus | |
| 3,132,693 A | 5/1964 | Weisend | |
| 3,304,266 A | 2/1967 | Sullivan | |
| 3,330,892 A | 7/1967 | Herrmann | |
| 3,359,225 A | 12/1967 | Weisend | |
| 3,454,095 A | 7/1969 | Messenger et al. | |
| 3,537,869 A * | 11/1970 | Proell ......................... | 106/665 |
| 3,560,403 A | 2/1971 | O'Hara et al. | |
| 3,763,021 A | 10/1973 | Householder | |
| 3,959,175 A | 5/1976 | Smith, Jr. et al. | |
| 3,987,855 A | 10/1976 | Messenger | |
| 4,124,075 A | 11/1978 | Messenger | |
| 4,173,999 A | 11/1979 | Messenger | |
| 4,258,790 A | 3/1981 | Hale | |
| 4,482,384 A * | 11/1984 | Miller ......................... | 106/664 |
| 4,508,628 A | 4/1985 | Walker et al. | |
| 4,515,635 A | 5/1985 | Rao et al. | |
| 4,555,269 A | 11/1985 | Rao et al. | |
| 4,566,977 A | 1/1986 | Hatfield | |
| 4,587,283 A | 5/1986 | Hille et al. | |
| 4,631,145 A | 12/1986 | Zychal | |
| 4,676,317 A | 6/1987 | Fry et al. | |
| 4,687,516 A | 8/1987 | Burkhalter et al. | |
| 4,780,220 A | 10/1988 | Peterson | |
| 4,818,288 A | 4/1989 | Aignesberger et al. | |
| 4,964,615 A | 10/1990 | Mueller et al. | |
| 5,015,273 A | 5/1991 | Hamilton et al. | |
| 5,096,883 A | 3/1992 | Mercer et al. | |
| 5,159,980 A | 11/1992 | Onan et al. | |
| 5,169,561 A | 12/1992 | Gentle et al. | |
| 5,293,938 A | 3/1994 | Onan et al. | |
| 5,333,698 A | 8/1994 | Van Slyke | |
| 5,523,019 A | 6/1996 | Kim | |
| 5,536,311 A | 7/1996 | Rodrigues | |
| 5,547,022 A | 8/1996 | Juprasert et al. | |
| 5,658,374 A * | 8/1997 | Glover ......................... | 106/2 |
| 5,658,860 A | 8/1997 | Clark et al. | |
| 5,707,940 A | 1/1998 | Bush et al. | |
| 5,858,928 A | 1/1999 | Aubert et al. | |
| 5,942,469 A | 8/1999 | Juprasert et al. | |
| 6,156,808 A | 12/2000 | Chatterji et al. | |
| 6,254,825 B1 | 7/2001 | Friedman ..................... | 422/44 |
| 6,297,202 B1 | 10/2001 | Chatterji et al. | |
| 6,395,853 B1 | 5/2002 | Oswald et al. | |
| 6,398,960 B1 | 6/2002 | Borden et al. | |
| 6,417,142 B1 | 7/2002 | Chatterji et al. | |
| 6,432,885 B1 | 8/2002 | Vollmer | |
| 6,482,360 B2 | 11/2002 | Friedman ..................... | 422/44 |
| 6,561,273 B2 | 5/2003 | Brothers et al. | |
| 6,620,770 B1 | 9/2003 | Kirnser et al. | |
| 6,861,392 B2 | 3/2005 | Shaarpour | |
| 6,887,833 B2 | 5/2005 | Brothes et al. | |
| 7,037,881 B2 | 5/2006 | Growcock et al. | |
| 7,150,322 B2 | 12/2006 | Szymanski ................... | 166/293 |
| 7,273,103 B2 | 9/2007 | Szymanski et al. | |
| 2003/0186819 A1 | 10/2003 | Shaarpour | |
| 2004/0138336 A1* | 7/2004 | Bredt et al. .................. | 523/160 |

(Continued)

FOREIGN PATENT DOCUMENTS

AU B-12936/83 3/1983

(Continued)

OTHER PUBLICATIONS

James Curtis, *Friendly Cement Debuts in North Sea*, E&P (Dec. 2006), pp. 68-69.
Foreign Communication from a Related Counterpart Application, Jan. 17, 2007.
Office Action from U.S. Appl. No. 11/145,277, Feb. 15, 2007.
Notice of Allowance from U.S. Appl. 11/145,277, Dec. 26, 2006.
Office Action from U.S. Appl. No. 11/145,277, Nov. 7, 2006.
Office Action from U.S. Appl. No. 11/860,308, Jan. 14, 2008.
Notice of Allowability for U.S. Appl. No. 11/145,277 dated May 1, 2007.

(Continued)

*Primary Examiner*—Paul Marcantoni
(74) *Attorney, Agent, or Firm*—Craig W. Roddy; Baker Botts, LLP

(57) ABSTRACT

Provided herein are defoaming agents that comprise lecithin and a solvent. Optionally, they may comprise hydrophobic particles. One embodiment provides a defoaming agent that comprises lecithin and a solvent.

18 Claims, No Drawings

U.S. PATENT DOCUMENTS

| | | |
|---|---|---|
| 2004/0171498 A1 | 9/2004 | Miller |
| 2005/0037929 A1 | 2/2005 | Kirsner et al. |
| 2005/0124502 A1 | 6/2005 | Shaarpour |
| 2005/0137093 A1 | 6/2005 | Miller |
| 2005/0137114 A1 | 6/2005 | Gatlin et al. |
| 2005/0241535 A1* | 11/2005 | Bohner ............... 106/690 |
| 2006/0160705 A1 | 7/2006 | Deville ............... 507/261 |
| 2006/0160706 A1 | 7/2006 | Deville ............... 507/261 |
| 2006/0216381 A1 | 9/2006 | Arudi ............... 426/330.6 |
| 2006/0272820 A1 | 12/2006 | Szymanski ............... 166/300 |
| 2007/0012222 A1 | 1/2007 | Szymanski ............... 106/802 |
| 2007/0054968 A1 | 3/2007 | Scoggins ............... 516/125 |
| 2007/0186818 A1* | 8/2007 | Bohner ............... 106/691 |
| 2008/0023199 A1 | 1/2008 | Szymanski et al. |
| 2008/0028992 A1* | 2/2008 | Lee et al. ............... 106/690 |

FOREIGN PATENT DOCUMENTS

| | | |
|---|---|---|
| DE | 1 769 543 | 9/1971 |
| DE | 198 02 733 A1 | 7/1999 |
| EP | 0 091 257 B1 | 10/1983 |
| EP | 0 339 762 A2 | 10/1989 |
| EP | 0 351 828 B1 | 1/1990 |
| EP | 0 475 568 A1 | 3/1992 |
| EP | 1 018 354 A1 | 7/2000 |
| GB | 2 218 136 A | 5/1988 |
| GB | 2 243 559 B | 11/1991 |
| GB | 2 244 279 A | 11/1991 |
| JP | 51080692 | 7/1976 |
| KR | 2001069736 | 7/2001 |
| RU | 1775125 A1 | 11/1992 |
| WO | WO 91/00763 | 1/1991 |
| WO | WO 91/01171 | 2/1991 |
| WO | WO 2006/129121 | 12/2006 |
| WO | WO 2006/129122 | 12/2006 |

OTHER PUBLICATIONS

"Oil Field Chemicals", Fink, Johannes K., Gulf Professional Publishing, p. 316-324, dated Jul. 14, 2003.
Halliburton brochure entitled "CFR-2 Cement Friction Reducer" dated 1999.
Halliburton brochure entitled "CFR-3™ Cement Friction Reducer" dated 2004.
Halliburton brochure entitled "D-Air 1 Anti-Foam Agent" dated 1999.
Halliburton brochure entitled "D-Air 2 Anti-Foam Agent" dated 1999.
Halliburton brochure entitled "D-Air 3 Defoamer" dated 1998.
Halliburton brochure entitled "D-AIR 3000 and D-AIr 3000L Defoamers" dated 1999.
Baroid brochure entitled "DRILTREAT® Oil Wetting Agent" dated 2005.
Halliburton brochure entitled "Halad®-9 Fluid-Loss Additive" dated 1999.
Halliburton brochure entitled "Halad®-344 Fluid-Loss Additive" dated 1998.
Halliburton brochure entitled "Halad®-*413 Fluid-Loss Additive" dated 1998.
Halliburton brochure entitled "Halad®-600 E+ Fluid-Loss Additive" dated 1999.
Halliburton brochure entitled "Hi-Dense® Weight Additives" dated 1998.
Halliburton brochure entitled "HR®-6L Cement Retarder" dated 1999.
Halliburton brochure entitled "HR®-12 Cement Retarder" dated 1999.
Halliburton brochure entitled "Latex 2000 Cement Additive" dated 1998.
Halliburton brochure entitled "NF-1 Additive Nonfoaming Agent" dated 1999.
Halliburton brochure entitled "NF-4 Additive Defoamer" dated 1999.
Halliburton brochure entitled "NF-5 Additive Defoaming Agent" dated 1999.
Halliburton brochure entitled "NF-6 Defoamer" dated 1998.
Halliburton brochure entitled "NF-7 Additive Defoaming Agent" dated 1999.
Halliburton brochure entitled "Pozmix® A Cement Additive" dated 1999.
Halliburton brochure entitled "SCR-500L™ High-Temperature Retarder" dated 2000.
Halliburton brochure entitled "SSA-1 Strength-Stabilizing Agent" dated 1998.
Halliburton brochure entitled "SSA-2 Coarse Silica Flour" dated 1999.
Halliburton brochure entitled "Stabilizer 434B Latex Stabilizer" dated 1999.
Halliburton brochure entitled "Stabilizer 434C Surfactant" dated 1998.
Foreign communication from a related counterpart application dated Aug. 30, 2006.
Office action from U.S. Appl. No. 11/145,277 dated Sep. 8, 2006.
Lechithin. Wikipedia, the free encyclopedia, GNU Free Documentation License, http://en.wikipedia.org/wiki/Lecithin, accessed Aug. 31, 2006.

* cited by examiner

CEMENT COMPOSITION COMPRISING ENVIRONMENTALLY COMPATIBLE DEFOAMING AGENTS AND METHODS OF USE

CROSS-REFERENCE TO A RELATED APPLICATION

This application is related to, U.S. patent application Ser. No. 11/145,277 filed on the same day herewith.

BACKGROUND

The present invention relates to subterranean operations, and more particularly, to environmentally compatible defoaming agents and methods of using such defoaming agents in subterranean well fluids.

When drilling or completing wells in subterranean formations, various fluids may be used for a variety of reasons. These fluids are often aqueous. For the purposes herein, such a fluid will be referred to as a "well fluid." Common uses for well fluids include, but are not limited to: lubrication and cooling of drill bit cutting surfaces while drilling generally or drilling-in (e.g., drilling in a targeted petroliferous formation); transportation of cuttings to the surface; controlling formation pressure to prevent blowouts; maintaining well stability; suspending solids in the well; fracturing the formation; cementing the well; displacing the fluid within the well with another fluid; cleaning the well; testing the well; and minimizing fluid loss into and stabilizing the formation through which the well is being drilled. Similar fluids also may be used in other applications such as tunnel drilling. Fluids used for such purposes are encompassed within the term "well fluid" as used herein.

Where surfactants are included in a well fluid that does not include a classical surfactant foam, foaming is likely to occur. This foaming may be undesirable. On the other hand, surfactants may be added to generate desirable foam to assist in removing the particulate products of drilling, or for other purposes. The term "foam" and its derivatives as used herein refers to both instances of entrained gas and gas bubbles that exist on the surface of a fluid. Oftentimes, defoaming agents commonly are utilized, for example, as components in well treatment fluids, to prevent the formation of foam or to break a formed foam (i.e., reduce the amount of foam present in the fluid) (both are referred to collectively herein as "breaking" the foam) during the preparation and placement of the well treatment fluid in the subterranean formation. "Defoaming agents" are well fluid additives that may lower interfacial tension in a well fluid so that gas trapped in a foam will readily escape from the well fluid. Defoaming agents also may be used to treat a foam in a return fluid to facilitate disposal of the fluid. Additionally, defoaming agents often are included in cement compositions, inter alia, to ensure proper mixing and to provide adequate control over the density of the cement composition.

A variety of defoaming agents are well known in the art. Dodecyl alcohol, aluminum stearate, various glycols, silicones and sulfonated hydrocarbons are examples of conventional defoamers. Many conventional defoamers have undesirable environmental characteristics and/or may be limited by strict environmental regulations in certain areas of the world. Moreover, many defoaming agents that comply with these strict environmental regulations may be relatively expensive and/or may suffer from other drawbacks, such as poorer defoaming performance.

SUMMARY

The present invention relates to subterranean operations, and more particularly, to environmentally compatible defoaming agents and methods of using such defoaming agents in subterranean well fluids.

In an embodiment, the present invention provides a defoaming agent comprising a lecithin and a solvent.

In another embodiment, the present invention provides a defoaming agent comprising a lecithin, a solvent, and calcium stearate.

In another embodiment, the present invention provides a cement composition comprising water, hydraulic cement, and a defoaming agent, the defoaming agent comprising a lecithin and a solvent.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean operations, and more particularly, to environmentally compatible defoaming agents and methods of using such defoaming agents in subterranean well fluids. The defoaming agents of the present invention may be used in any applicable well fluid. In some preferred embodiments, the defoaming agents of the present invention may be used in conjunction with a cement composition. One of the many advantages of the defoaming agents of the present invention is that in many embodiments all of their components are environmentally acceptable according to the OSPAR Convention for the Protection of the Marine Environment in the North-East Atlantic Region regulations (2004-2005).

The defoaming agents of the present invention comprise lecithin, a solvent, and, optionally, a plurality of hydrophobic particles. In some embodiments, the lecithin:solvent ratio is about 1:100 to about a 100:1. This ratio may vary depending on pour point, cost, and other issues familiar to those skilled in the art. In more preferred embodiments, the ratio may be from about 1:2 to about 2:1. An example of a defoaming agent of the present invention comprises lecithin and butanol in a ratio of about 1:1 to about 2:1. A more preferred example comprises lecithin, 2-butanol, and calcium stearate.

Lecithin is an oily base that will break a foam. More particularly, lecithin is a phospholipid. Lecithin is found in all living organisms. Lecithin is one of the major components in cell membranes, along with protein and cholesterol. Lecithin may be synthesized from choline. Lecithin is used as a stabilizer and emulsifier in foods. Lecithin is environmentally acceptable according to the OSPAR Convention for the Protection of the Marine Environment in the North-East Atlantic Region regulations (2004-2005). The lecithin used in the defoaming agents of the present invention may be natural or synthetic. In a preferred embodiment, the lecithin may be a CAS No. 8002-46-5 lecithin or a CAS No. 8030-76-0 soya lecithin. In another embodiment, the lecithin may be chemically or enzymatically modified. One should note that some modified lecithins may have different environmental considerations than others. The term "lecithin" as used herein includes natural, synthetic, and modified lecithins. For more information on lecithin and its many variants, please see the KIRK-OTHMER ENCYCLOPEDIA OF CHEMICAL TECHNOLOGY, 4th ed. Volume 15, pages 192-210, John Wiley & Sons, 1995. *Lecithins Sources, Manufacture & Uses*, by Bernard F. Szuhaj, AMERICAN OIL CHEMISTS SOCIETY, 1985 and *Lecithins*, by Bernard F. Szuhaj and Gary R. List, AMERICAN OIL CHEMISTS SOCIETY, 1985.

Because of lecithin's inherent viscosity (e.g., thick like honey), a solvent that is capable of reducing this viscosity is preferably included in the defoaming agents of the present invention. A preferred solvent also will act as a surface tension reducer in a well fluid, which should help collapse any foam structure present therein. Examples include, but are not limited to, glycol ethers, methanol, ethanol, propanol, isopropanol, hexanol, heptanol, butanol, glycols, esters of fatty acids, paraffins, ester oils, higher internal olefins, polypropylene glycol, silicon oils, surfactants, and base oils. The choice of which solvent to use will be guided by the location of the well, applicable environmental regulations, and any handling concerns. In preferred embodiments, the solvent is also acceptable under the OSPAR Convention for the Protection of the Marine Environment in the North-East Atlantic Region regulations (2004-2005). Those that would meet these criteria would be $C_1$ to $C_4$ alcohols, glycols, and base oils.

Optionally, hydrophobic particles may be included in the defoaming agents of the present invention. Hydrophobic particles suitable for use in the defoaming agents of the present invention include, but are not limited to, graphite, fatty acid salts, salts of stearates, calcium stearate, aluminum stearate, hydrophobically-modified silica, and hydrophobically-modified clay. Commercially available examples of hydrophobic particles that may be suitable include, but are not limited to, those that are commercially available from Southern Clay under the trade names "CLAYTONE" and "CLOISITE." Preferred hydrophobic particles are acceptable under the OSPAR Convention for the Protection of the Marine Environment in the North-East Atlantic Region regulations (2004-2005). Examples of preferred hydrophobic particles include calcium stearate. One should note that a particularly advantageous synergistic effect may be achieved when using calcium stearate with lecithin. Another preferred example of hydrophobic particles is surface-treated sand. One should note, however, that surface treated sand is not acceptable under the OSPAR Convention for the Protection of the Marine Environment in the North-East Atlantic Region regulations (2004-2005). Where included in the defoaming agents of the present invention, the hydrophobic particles may be present in an amount in the range of from about 0.01% to about 100% by weight of the defoaming agent. In certain embodiments, the hydrophobic particles may be present in an amount in the range of from about 1% to about 20% by weight of the defoaming agent. In certain embodiments, the hydrophobic particles may have a size in the range of from about 0.1 to about 50 micrometers. In certain embodiments, the hydrophobic particles may have a size that may be smaller than about 0.1 micrometers, or that may be greater than about 50 micrometers.

The defoaming agents of the present invention may be added to any well fluid wherein it is desirable to reduce the amount of foam that may be present therein. Suitable well fluids include, but are not limited to, drilling fluids, stimulation fluids, return fluids (which include, but are not limited to, return foamed cement compositions), completion fluids, and cementing compositions. In one embodiment, the present invention provides a method of reducing foam generation in a well fluid, comprising adding a defoaming agent that comprises lecithin and a solvent to the well fluid. Generally, a defoaming agent of the present invention should be included in an amount of from about 0.01% to about 10% v/v. A preferred range is from about 0.1% to about 2% v/v.

In one embodiment, the present invention provides a method comprising: providing a well fluid that comprises foam; providing a defoaming agent that comprises lecithin and a solvent; contacting the well fluid with the defoaming agent so that the amount of foam present in the well fluid is reduced; and introducing the well fluid into a subterranean formation. In a preferred embodiment, the defoaming agent also comprises hydrophobic particles. In an even more preferred embodiment, the hydrophobic particles comprise calcium stearate.

Depending on the particular application, the well fluid may be introduced into the subterranean formation either before or after the well fluid is contacted with the defoaming agent. The well fluids in these embodiments may be any aqueous well fluid that comprises foam that may be introduced into a subterranean formation, e.g., a drilling fluid, a cement composition, a stimulation fluid, a completion fluid, or a return fluid. The defoaming agent may be added to the well fluid in any suitable manner including, but not limited to, by injection, mixing, or spraying.

In a return fluid embodiment, a defoaming agent of the present invention may be added to a return fluid that comprises foam to reduce the amount of foam present therein. In an example of such a method, the present invention provides a method comprising: providing a return fluid that comprises foam; providing a defoaming agent that comprises lecithin, and a solvent; and contacting the return fluid with the defoaming agent so that the amount of foam present in the return fluid is reduced. The return fluid can then be handled appropriately. In a preferred embodiment, the defoaming agent also comprises hydrophobic particles. In an even more preferred embodiment, the hydrophobic particles comprise calcium stearate.

In examples of specific cementing-related embodiments, the defoaming agents of the present invention may be added to a cement composition to reduce the amount of any foam present therein. Cement compositions of the present invention generally comprise water, a hydraulic cement, and a defoaming agent of the present invention. In a preferred embodiment, the defoaming agent also comprises hydrophobic particles. In an even more preferred embodiment, the hydrophobic particles comprise calcium stearate. In certain embodiments, the defoaming agents of the present invention may be present in the cement compositions in an amount in the range of from about 0.001% to about 10% v/v. In certain embodiments, the defoaming agents of the present invention may be present in the cement compositions in an amount in the range of from about 0.01% to about 2% v/v.

The water utilized in the cement compositions of the present invention may be fresh water, salt water (e.g., water containing one or more salts dissolved therein), brine (e.g., saturated salt water), or seawater. Generally, the water may be from any source provided that it does not contain an excess of compounds that may adversely affect other components in the cement composition. Further, the water may be present in an amount sufficient to form a pumpable slurry. In certain embodiments, the water may be present in the cement compositions of the present invention in an amount in the range of from about 10% to about 200% by weight of the cement ("bwoc") therein. In certain embodiments, the water may be present in the cement compositions of the present invention in an amount in the range of from about 30% to about 90% bwoc therein. In certain embodiments, the water may be present in the cement compositions of the present invention in an amount in the range of from about 30% to about 50% bwoc therein. One of ordinary skill in the art, with the benefit of this disclosure, will recognize the appropriate amount of water for a chosen application.

Any cement suitable for use in subterranean applications may be suitable for use in the present invention. In certain embodiments, the cement compositions of the present invention comprise a hydraulic cement. A variety of hydraulic cements may be suitable for use, including those comprising calcium, aluminum, silicon, oxygen, and/or sulfur, which may set and harden by reaction with water. Such hydraulic cements include, but are not limited to, Portland cements, pozzolanic cements, gypsum cements, soil cements, calcium phosphate cements, high alumina content cements, silica cements, high alkalinity cements, and mixtures thereof.

Optionally, the cement compositions of the present invention may comprise a lost circulation material. The lost circulation material may be any suitable material that minimizes the loss of fluid circulation into fractures and/or permeable zones of the formation. Lost circulation materials typically comprise a variety of materials, which may include, but are not limited to, asphaltenes, ground coal, cellulosic materials, plastic materials, and the like. The lost circulation materials may be provided in particulate form. One of ordinary skill in the art, with the benefit of this disclosure, will recognize the appropriate amount of lost circulation material for a chosen application.

Optionally, other additional additives may be added to the cement compositions of the present invention as deemed appropriate by one skilled in the art with the benefit of this disclosure. Examples of such additives include, inter alia, fly ash, silica compounds, fluid loss control additives, dispersants, accelerators, retarders, salts, mica, sand, fibers, formation conditioning agents, fumed silica, bentonite, microspheres, weighting materials, and the like. Examples of suitable fluid loss control additives include those that are commercially available from Halliburton Energy Services, Inc., of Duncan, Okla., under the trade names LATEX 2000™, HALAD®9, HALAD®200, HALAD®344, HALAD®413, and HALAD®600. Examples of suitable dispersants include those that are commercially available from Halliburton Energy Services, Inc., of Duncan, Okla., under the trade names CFR®2L and CFR®3L. An example of a suitable silica compound is a silica flour commercially available from Halliburton Energy Services, Inc., of Duncan, Okla., under the trade name SSA-1. An example of a suitable fly ash is an ASTM class F fly ash that is commercially available from Halliburton Energy Services of Dallas, Tex., under the trade name POZMIX®A. Examples of suitable retarders include those that are commercially available from Halliburton Energy Services, Inc., of Duncan, Okla., under the trade names SCR-500™, HR®12, HR®6L, and HR®4L.

In some embodiments, the cement composition may be foamed, meaning that it may comprise foam that may be produced by any suitable method including the addition of an expanding additive or a gas to the cement composition.

In one embodiment, the present invention provides a method of cementing in a subterranean formation comprising: providing a cement composition that comprises water, a hydraulic cement, and foam; providing a defoaming agent, the defoaming agent comprising lecithin and a solvent; contacting the cement composition with the defoaming agent so as to reduce the amount of foam present in the cement composition; placing the cement composition in at least a portion of a subterranean formation; and allowing the cement composition to set therein. In a preferred embodiment, the defoaming agent also comprises hydrophobic particles. In an even more preferred embodiment, the hydrophobic particles comprise calcium stearate.

In another embodiment, the present invention provides a method of treating a return foamed cement composition (which is a foamed cement composition that has been sent downhole and then returned to the surface). In an example of such a method, a defoaming agent of the present invention may be added to the return foamed cement composition to reduce the amount of foam present therein. In a preferred embodiment, the defoaming agent also comprises hydrophobic particles. In an even more preferred embodiment, the hydrophobic particles comprise calcium stearate.

In another embodiment, the present invention provides a method of cementing in a subterranean formation, comprising: providing a cement composition that comprises water, hydraulic cement, and a defoaming agent, the defoaming agent comprising lecithin and a solvent; placing the cement composition in at least a portion of a subterranean formation; and permitting the cement composition to set therein.

In another embodiment, the present invention provides a method of treating a drilling fluid that comprises: providing a drilling fluid; pumping the drilling fluid into a well bore penetrating a subterranean formation; circulating the drilling fluid through the well bore and back to a drilling rig; allowing the drilling fluid to incorporate a foam; pumping the drilling fluid into a pit; providing a defoaming agent that comprises lecithin and a solvent; contacting the drilling fluid with the defoaming agent so as to reduce the amount of foam present in the drilling fluid; and repumping the drilling fluid into the well bore. In a preferred embodiment, the defoaming agent also comprises hydrophobic particles. In an even more preferred embodiment, the hydrophobic particles comprise calcium stearate.

The defoaming agents of the present invention may be useful in tunneling applications as well as oilfield applications.

To facilitate a better understanding of the present invention, the following examples of certain aspects of some embodiments are given. In no way should the following examples be read to limit, or define, the scope of the invention.

EXAMPLES

Table 1 illustrates the mixtures of defoaming agents tested:

TABLE 1

|  | Mixture 1 | Mixture 2 | Mixture 3 | Mixture 4 |
|---|---|---|---|---|
| Lecithin | 5 g (50% w) | 10 g (66% w) | 30 g (69.77%) | 30 g (54.55%) |
| 2-butanol | 5 g (50% w) | 5 g (33% w) | 10 g (23.26%) | 10 (18.18%) |
| Calcium stearate | 0 | 0 | 3 g (6.98%) | 15 g (27.27%) |

Both defoaming agent Mixture 1 and defoaming agent Mixture 2 were tested in a foamed fluid. The foamed fluids were made by adding 500 ml of tap water to a 1000 ml blender, mixing it at 4000 rpm, and then adding 1 ml of coco-amido propyl betaine as a foaming agent. Foam was allowed to rise in the blender to fill the blender. Defoaming agents Mixture 1 and Mixture 2 were then added (separately) to a foamed fluid in the blender. Conventional defoaming agents D-AIR3000™ and NF-6™, both available under these tradenames from Halliburton Energy Services in Duncan, Okla., were tested as controls. Table 2 illustrates the amounts of the defoaming agents added to each foamed fluid in the blender.

TABLE 2

| Test | Defoamer | ml |
|---|---|---|
| 1 | D-AIR3000L ™ | 0.3 |
| 2 | NF-6 ™ | 1.0 |
| 3 | Mixture 2 | 1.0 |
| 4 | Mixture 2 | 2.0 |
| 5 | Mixture 1 | 1.0 |

Table 3 lists the results that were observed.

TABLE 3

| Test No. | Defoaming Agent Used | Speed of Mixing | Observations Regarding Some Residual Foam Present in the Blender |
|---|---|---|---|
| 1 | D-AIR3000 ™ | Fast | No |
| 2 | NF-6 ™ | Moderate | Yes |
| 3 | Mixture 2 | Moderate | Yes |
| 4 | Mixture 2 | Moderate | Yes |
| 5 | Mixture 1 | Moderate | Yes |

To illustrate the effects of a defoaming agent of the present invention in a cement composition, Mixture 2 (from Table 1) was tested in cement compositions. Table 4 illustrates the components of the cement compositions:

TABLE 4

| Component | Cement Composition 1 (g) | Cement Composition 2 (g) |
|---|---|---|
| Water | 244.3 | 244.3 |
| Class H Cement | 500 | 500 |
| SSA-2 Sand | 175 | 175 |
| HiDense #3 (available from Halliburton Energy Services) | 244 | 244 |
| Halad-9 (available from Halliburton Energy Services) | 3 | 3 |
| NaCl | 90.4 | 90.4 |
| Mixture 2 (Defoaming Agent) | 11.2 | 0.0 |

The dry materials were weighed and then added to a blender. Mixture 2 defoaming agent was added to the mix water. The cement composition was then mixed to form a slurry. The slurry was then poured into a sample holder and let set in atmospheric water bath overnight. The densities of each of the set samples were taken to observe what effect the defoaming agents had on the density of the set cements. The most desired density is about 18.7 pounds per gallon. Table 5 illustrates the results.

TABLE 5

| Sample | Slurry 1 Density | Slurry 2 Density | Theoretical Density Desired |
|---|---|---|---|
| Top | 18.3 lb/gal | 16.8 lb/gal | 18.7 lb/gal |
| Middle | 19.0 lb/gal | 17.4 lb/gal | 18.7 lb/gal |
| Bottom | 19.4 lb/gal | 17.7 lb/gal | 18.7 lb/gal |

Table 5 illustrates that the addition of a defoaming agent of the present invention to a cement composition gives the cement composition a more desirable density.

Defoaming agent Mixtures 3 and 4 were added to a cement slurry. Table 6 lists the components of the cement slurry:

TABLE 6

| Component | Slurry 1 | Slurry 2 | Slurry 3 |
|---|---|---|---|
| Water (liter/sack) | 27.55 | 27.55 | 27.55 |
| Class G Cement (kg/sack) | 100 | 100 | 100 |
| Latex 2000 ™ (available from Halliburton Energy Services) (liter/sack) | 20 | 20 | 20 |
| Stabilizer 434C ™ (available from Halliburton Energy Services) (liter/sack) | 2.5 | 2.5 | 2.5 |
| CFR-3L ™ Dispersant (available from Halliburton Energy Services) (liter/sack) | 2 | 2 | 2 |
| HR-4L ™ Retarder (available from Halliburton Energy Services) (liter/sack) | 0.5 | 0.5 | 0.5 |
| NF-6 ™ Defoaming Agent (available from Halliburton Energy Services) (liter/sack) | 0.2 | 0 | 0 |
| Defoaming Agent Mixture 3 (liter/sack) | 0 | 0.2 | 0 |
| Defoaming Agent Mixture 4 (liter/sack) | 0 | 0 | 0.2 |
| Data Theoretical Density of 14.99 (lb/gal) | 11.36 | 11.87 | 12.65 |
| Thickening Time (hr:min) | 1.42 | 1.41 | 1.42 |

Slurry number 3 has a density closer to the desired density than Slurry 1 or 2. Also, the thickening time data indicates that there is not adverse effect as a result of the defoaming agent used. A synergistic effect may be seen between the lecithin and calcium stearate in Mixture 4.

Another experiment was run to observe the comparative effects of Mixture 2, lecithin only, and calcium stearate only in a cement composition. The stearate was mixed with enough butanol to make it fluid. Table 7 lists the components of the cement compositions and the density results.

TABLE 7

| Component | Slurry 1 | Slurry 2 | Slurry 3 | Slurry 4 | Slurry 5 |
|---|---|---|---|---|---|
| Water (liter/sack) | 27.55 | 27.55 | 27.55 | 27.55 | 27.55 |
| Class G Cement (kg/sack) | 100 | 100 | 100 | 100 | 100 |
| Latex 2000 ™ (available from Halliburton Energy Services) (liter/sack) | 20 | 20 | 20 | 20 | 20 |
| Stabilizer 434C ™ (available from Halliburton Energy Services) (liter/sack) | 2.5 | 2.5 | 2.5 | 2.5 | 2.5 |

TABLE 7-continued

| Component | Slurry 1 | Slurry 2 | Slurry 3 | Slurry 4 | Slurry 5 |
|---|---|---|---|---|---|
| CFR-3L ™ Dispersant (available from Halliburton Energy Services) (liter/sack) | 2 | 2 | 2 | 2 | 2 |
| HR-4L ™ Retarder (available from Halliburton Energy Services) (liter/sack) | 0.5 | 0.5 | 0.5 | 0.5 | 0.5 |
| Lecithin (grams) | 2.0 | 3.0 | 3.0 | 0 | 0 |
| Calcium stearate with butanol (grams) | 0 | 0 | 0 | 2.0 | 3.0 |
| Mixture 2 from Table 1 (grams) | 0 | 0 | 2.0 | 0 | 0 |
| Data Specific Gravity | 1.31 | 1.56 | 1.58 | 0.78 | 1.16 |

As can be seen in Table 7, as far as specific gravity of a cement composition, the combination of lecithin and calcium stearate appears to be desirable over either lecithin or calcium stearate alone.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A cement composition comprising:
   hydraulic cement;
   water; and
   a defoaming agent comprising lecithin and a solvent, wherein the solvent comprises butanol.

2. The composition of claim 1 wherein the cement composition comprises at least one of the following: a lost circulation material; fly ash; a silica compound; a fluid loss control additive; latex; a dispersant; an accelerator; a retarder; a salt; mica; sand; a fiber; a formation conditioning agent; fumed silica; bentonite; a microsphere; or a weighting material.

3. The composition of claim 1 wherein the cement composition comprises at least one of the following: fresh water; salt water; seawater; a Portland cement; a pozzolanic cement; a gypsum cement; a soil cement; a calcium phosphate cement; a high alumina content cement; a silica cement; or a high alkalinity cement.

4. The composition of claim 1 wherein the defoaming agent comprises hydrophobic particles.

5. The composition of claim 4 wherein the hydrophobic particles comprise at least one of the following: graphite, aluminum stearate, hydrophobically-modified silica, hydrophobically-modified clay, calcium stearate, or surface treated sand.

6. The composition of claim 1 wherein the lecithin butanol ratio is from about 1:100 to about 100:1.

7. The composition of claim 4 wherein the hydrophobic particles comprise calcium stearate.

8. The composition of claim 1 wherein the lecithin butanol ratio is from about 1:2 to about 2:1.

9. A cement composition comprising:
   hydraulic cement;
   water; and
   a defoaming agent comprising lecithin, a solvent, and calcium stearate.

10. The composition of claim 9 wherein the lecithin is a CAS No. 8002-46-5 lecithin or a CAS No. 8030-76-0 soya lecithin.

11. The composition of claim 9 wherein the cement composition comprises at least one of the following: a lost circulation material; fly ash; a silica compound; a fluid loss control additive; latex; a dispersant; an accelerator; a retarder; a salt; mica; sand; a fiber; a formation conditioning agent; fumed silica; bentonite; a microsphere; or a weighting material.

12. The composition of claim 9 wherein the cement composition comprises at least one of the following: fresh water; salt water; seawater; a Portland cement; a pozzolanic cement; a gypsum cement; a soil cement; a calcium phosphate cement; a high alumina content cement; a silica cement; or a high alkalinity cement.

13. The composition of claim 9 wherein the lecithin:solvent ratio is from about 1:100 to about 100:1.

14. The composition of claim 9 wherein the solvent comprises at least one of the following: a hydrophobic solvent; methanol; ethanol; propanol; isopropanol; hexanol; heptanol; butanol; a glycol; an ester of a fatty acid; paraffin; an ester oil; a higher internal olefin; polypropylene glycol; a silicon oil; a surfactant; or a base oil.

15. The composition of claim 9 wherein the solvent is capable of acting as a surface tension reducer in a well fluid.

16. The composition of claim 9 wherein the lecithin:solvent ratio is from about 1:2 to about 2:1.

17. A cement composition comprising:
   hydraulic cement;
   water; and
   a defoaming agent comprising lecithin, butanol, and hydrophobic particles.

18. The composition of claim 17 wherein the hydrophobic particles comprise at least one of the following: graphite, aluminum stearate, hydrophobically-modified silica, hydrophobically-modified clay, or surface treated sand.

* * * * *

UNITED STATES PATENT AND TRADEMARK OFFICE
CERTIFICATE OF CORRECTION

| | | |
|---|---|---|
| PATENT NO. | : 7,670,423 B2 | Page 1 of 1 |
| APPLICATION NO. | : 11/147721 | |
| DATED | : March 2, 2010 | |
| INVENTOR(S) | : Szymanski et al. | |

It is certified that error appears in the above-identified patent and that said Letters Patent is hereby corrected as shown below:

Title page 1 of the patent at Inventors, replace "Szymaski" with -- Szymanski --.

Signed and Sealed this

Twenty-eighth Day of September, 2010

David J. Kappos
*Director of the United States Patent and Trademark Office*